US012538873B2

United States Patent
Fuchs et al.

(10) Patent No.: US 12,538,873 B2
(45) Date of Patent: Feb. 3, 2026

(54) SQUARE BALER

(71) Applicant: Usines CLAAS France S.A.S, Woippy (FR)

(72) Inventors: Volker Fuchs, Saarburg (DE); Michael Schulte, Delbrück (DE); Robert Obermeier-Hartmann, Bad Driburg (DE)

(73) Assignee: Usines CLAAS France S.A.S, St. Rémy/Woippy (FR)

( * ) Notice: Subject to any disclaimer, the term of this patent is extended or adjusted under 35 U.S.C. 154(b) by 241 days.

(21) Appl. No.: 18/541,981

(22) Filed: Dec. 15, 2023

(65) Prior Publication Data
US 2024/0196802 A1 Jun. 20, 2024

(30) Foreign Application Priority Data
Dec. 16, 2022 (DE) .......................... 102022133714.6

(51) Int. Cl.
*A01F 15/08* (2006.01)
*A01F 15/04* (2006.01)

(52) U.S. Cl.
CPC .......... *A01F 15/0841* (2013.01); *A01F 15/04* (2013.01)

(58) Field of Classification Search
CPC .............. A01F 15/0841; A01F 15/0825; A01F 15/042; B30B 9/306; F16H 37/124;
(Continued)

(56) References Cited

U.S. PATENT DOCUMENTS 6,105,353 A * 8/2000 Mohr .................... A01D 69/005
                                                      475/2
6,708,478 B1    3/2004 Mesmer et al.
(Continued)

FOREIGN PATENT DOCUMENTS

EP    3508052 A1    7/2019
EP    4151077 A1    3/2023
(Continued)

OTHER PUBLICATIONS

European Search Report for EP Application No. 23204242.4-1105 mailed Apr. 4, 2024.

*Primary Examiner* — Jimmy T Nguyen
(74) *Attorney, Agent, or Firm* — Lempia Summerfield Katz LLC

(57) ABSTRACT

A square baler that includes at least one ram movably arranged in a pressing channel between end positions and a drivetrain which is designed to drive at least the ram. The drivetrain has a torque input connection through which torque is supplied to the drivetrain. The drivetrain includes a transmission device arranged downstream from the torque input connection and has at least one flywheel. The transmission device has a first power splitter that is connected to the torque input connection, and two reduction gears that are assigned to the ram and are connected in parallel to one another to the first power split. At least one flywheel is connected upstream from each reduction gear. A shiftable clutch device is interposed between the first power split and the at least one flywheel and engages the at least one flywheel when the square baler is initially operated or during a startup process.

19 Claims, 3 Drawing Sheets

(58) Field of Classification Search
CPC .... F16H 37/0833; F16H 37/042; F16H 37/04; F16H 3/663; F16H 3/46; F16H 3/006; B60K 6/547; B60K 6/48; B60K 6/387; A01D 89/001; A01D 69/08
See application file for complete search history.

(56) References Cited

U.S. PATENT DOCUMENTS

| | | |
|---|---|---|
| 8,973,493 B2 | 3/2015 | O'reilly et al. |
| 2003/0167939 A1 | 9/2003 | Roth |
| 2014/0165859 A1 | 6/2014 | O'Reilly et al. |
| 2016/0081258 A1* | 3/2016 | Bonte .................. A01B 61/025 74/15.4 |
| 2016/0157434 A1 | 6/2016 | Arnould et al. |
| 2017/0105352 A1 | 4/2017 | Rosseel et al. |
| 2018/0242528 A1 | 8/2018 | Rodewald |
| 2021/0015049 A1 | 1/2021 | Naeyaert et al. |
| 2021/0127580 A1 | 5/2021 | Singh et al. |
| 2021/0259156 A1 | 8/2021 | Bonte et al. |
| 2023/0077734 A1 | 3/2023 | Scharf et al. |
| 2024/0090382 A1 | 3/2024 | Führle |

FOREIGN PATENT DOCUMENTS

| | | |
|---|---|---|
| WO | 2014170318 A1 | 10/2014 |
| WO | 2022219030 A1 | 10/2022 |

\* cited by examiner

US 12,538,873 B2

SQUARE BALER

CROSS REFERENCE TO RELATED APPLICATION

This application claims priority under 35 U.S.C. § 119 to German Patent Application No. DE 102022133714.6 filed Dec. 16, 2022, the entire disclosure of which is hereby incorporated by reference herein. The application is related to U.S. utility application Ser. No. 118/541,984, incorporated by reference herein in its entirety.

TECHNICAL FIELD

The present invention relates to a square baler.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Square balers may be used in agriculture to: pick up or collect, for example, semi-mature harvested material such as straw, hay, grass or the like, which has been deposited in a swath; shred it further; and compress or press it into square bales. For example, US Patent Application Publication No. 2016/0157434 A1 and U.S. Pat. No. 6,708,478 each disclose square balers, both of which are incorporated by reference herein in their entirety. For this purpose, the square balers have various working units which serve for the required conveying and/or further processing of the harvested material. Such working units are, for example, a cutting rotor for shredding the collected harvested material, a feed rake for pre-compacting and feeding the harvested material shredded by the cutting rotor into a pressing channel of the square baler, a ram which is movably arranged in the pressing channel and presses the pre-compacted harvested material located in the pressing channel into a square bale, and a knotter which binds the pressed bale. These working units are usually drivingly connected with a central drivetrain of the square baler, which is connected to a power take-off shaft of an agricultural production machine, such as a tractor, when the square baler is in operation. To drive working units of the square baler, such as the ram, a gear assembly is provided which drives the ram arranged in the press channel of the square baler so as to be movable between end positions, and at least one further working unit of the square baler.

Such square balers conventionally comprise a so-called flywheel, which serves as a damper and energy store between a drive unit of the agricultural production machine providing the drive output of the square baler and the working units of the square baler.

BRIEF DESCRIPTION OF THE DRAWINGS

The present application is further described in the detailed description which follows, in reference to the noted drawings by way of non-limiting examples of exemplary embodiment, in which like reference numerals represent similar parts throughout the several views of the drawings, and wherein.

DETAILED DESCRIPTION

Figure 1:
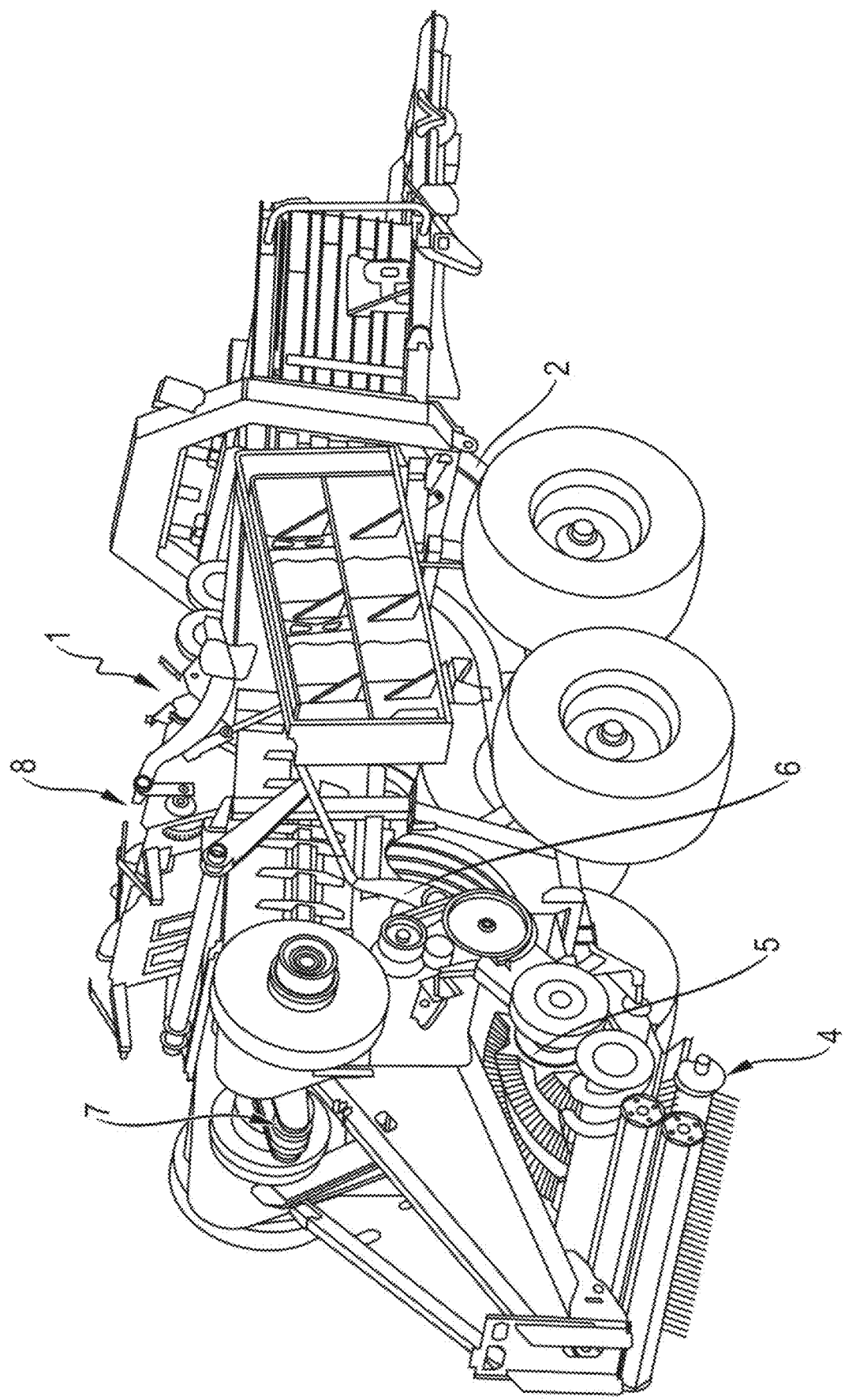
FIG. 1 illustrates a schematic and exemplary representation of a square baler in side view.

As discussed in the background, square balers may include a so-called flywheel, which serves as a damper and energy store between a drive unit of the agricultural production machine providing the drive output of the square baler and the working units of the square baler. Efforts are being made to develop increasingly powerful and larger square balers which compress harvested material that has been transferred to the pressing channel and pre-compressed into a square bale with a very high pressure. These efforts may lead to the fact that ever higher drive outputs must be supplied to the ram using the drivetrain of the square baler, which may, in turn, lead to the fact that ever larger and heavier flywheels must be installed in order to be able to provide the required drive outputs at all and to reduce any loads on the drivetrain of the square baler during operation.

However, the use of larger and heavier flywheels leads to an increase in the weight of the square baler, and a very high drive output is required to accelerate the flywheel from a standstill. At present, such flywheels are arranged or positioned on a drive shaft of the square baler, which is often designed as a cardan shaft and is connected to a torque input connection at which the drive output of the drive unit of the agricultural production machine is provided using a power take-off shaft. The drive shaft carrying the flywheel may be mechanically connected to the working units of the square baler. Accordingly, when the square baler is started, the flywheel must therefore always be accelerated from a standstill together with a majority of the drivetrain components and the working units of the square baler connected to the drivetrain. With some agricultural machines, this may mean that when the square baler is started up, the drive unit of the agricultural machine stalls undesirably due to the high inertia, making it difficult or impossible to start up the square baler. In addition, the engagement clutch may be damaged.

The square baler described in WO 2014/170318 A1 comprises a transmission device arranged on a cardan shaft between a torque input connection and a flywheel, which may be switched between a starting state and an operating state. In the operating state, the transmission device transmits a rotary motion of a power take-off shaft of an agricultural production machine completely to a flywheel so that the transmission is comparable to a conventional axle. On the other hand, in the starting state, the transmission device transmits the rotary motion of the PTO shaft to the flywheel only partially. This allows the PTO shaft to have a higher speed than the flywheel. The transmission device is designed as a planetary gear or as a friction clutch. Due to the transmission device, a flywheel may be used in the square baler that is too heavy and/or too large per se to be put into operation via a direct connection.

An increase in the drive power of the ram means that the dimensions of the drivetrain, in particular the transmission components, must be adapted, or an agricultural machine with a higher drive power must be used.

Based on the aforementioned prior art, it is therefore the task of the present invention to further develop a square baler of the type mentioned above which reliably provides the drive power required in the working units of the square baler, in particular the drive power of the ram, and is characterized by a lower requirement for the drive power to be provided by the working machine.

In one or some embodiments, a square baler is disclosed which comprises at least one ram movably arranged in a pressing channel between end positions and a drivetrain which is configured to drive at least the ram, wherein the drivetrain has a torque input connection through which a torque may be supplied to the drivetrain, wherein the drivetrain comprises a transmission device which is arranged or positioned downstream from the torque input connection and has at least one flywheel. According to one or some embodiments, the transmission device comprises a first power split which is connected to the torque input connection, and two reduction gears assigned to the ram which are connected in parallel to one another to the first power split, wherein at least one flywheel is upstream from each reduction gear, wherein a shiftable clutch device is interposed or positioned between the first power split and at least one of the flywheels, wherein the clutch device is arranged or positioned to engage the at least one flywheel when the square baler is started up or during a start-up process.

In one or some embodiments, the square baler is configured to enable the use of at least two flywheels which are smaller than the one flywheel known from the prior art. Due to the at least one shiftable clutch device, only one of the at least two flywheels may initially be driven during start-up and/or a start-up process of the square baler, as a result of which the need for drive power to be made available on the part of the working machine may be lower. The other flywheel need only be engaged at a later point in time by actuating the shiftable clutch device. As discussed in more detail below, the control device may be configured to automatically control engagement of one, some, or each of the flywheels in a sequence. In this regard, the initial operation and/or the start-up process of the square baler may take place in stages, such as a first stage (e.g., engaging a first flywheel) and a second stage (e.g., engaging a second flywheel while still engaging the first flywheel or after disengaging the first flywheel). Another advantage resulting from this is that the load on the torque input connection as well as a drive shaft of the agricultural machine may be subject to a lower load due to the staged process during initial operation and/or the execution of the start-up process. Thus, the risk of damage due to incorrect operation during initial operation may also be reduced.

In particular, at least one side gear may be interposed between the first power split and the reduction gears associated with the ram. The combination of side gear and this downstream flywheel may allow the at least two flywheels to be smaller than in conventional drivetrains known from the prior art. The tasks to be fulfilled by the flywheel, such as shielding against torque surges of the ram or the working units and/or reducing speed fluctuations of the drivetrain, may be fulfilled equally effectively by the at least two smaller flywheels. A decoupling of the first power split and the reduction gear achieved by means of the side gear may also ensure a modular design of the drivetrain, so that it may be adapted in an uncomplicated manner with regard to different power classes and sizes of square balers by replacing individual assemblies of the drivetrain, without having to fundamentally adapt the drivetrain concept or layout.

In one or some embodiments, one of the flywheels may be interposed between the reduction gears assigned to the ram and the associated side gear. This may make it particularly easy to bridge a spatial distance existing between the power split and the ram in a particularly simple manner, without drivetrain components being arranged in the center of the square baler between the first power split and the ram, which may create installation space restrictions that conflict with a design of the square baler.

In one or some embodiments, the at least one shiftable clutch device is integrated into at least one of the side gears. In particular, the side gears may be designed as traction gears, such as V-belt gears or chain gears. The design of the two side gears as traction gears may make it possible to compensate for torsion in the two reduction gears assigned to the ram during operation of the square baler due to a load generated by the ram during operation or to prevent such torsion from being transferred to other assemblies of the drivetrain, as this could lead to damage or destruction of the components.

The use of a V-belt gearbox may be advantageous in this context since it may allow the costs of the drivetrain to be kept low. However, chain gears may be used equally well with regard to the purpose. It is also contemplated to design the side gear as a bevel gear stage, wherein a bevel gear of the bevel gear stage which may be operatively connected to an output shaft of the first power split is connected via a cardan shaft to a second bevel gear, which may, in turn, drive the at least one flywheel of the particular side gear.

Alternatively, the side gears may be designed as spur gears or crown gears.

Furthermore, the at least one shiftable clutch device may be designed as a displaceable drive wheel of the side gear designed as a traction gear.

Another alternative is the design of the at least one shiftable clutch device as a belt clutch, which may be integrated into one of the side gears designed as a traction gear.

In one or some embodiments, the at least one shiftable clutch device may be arranged or positioned on an output shaft connecting the first power split and one of the side gears. In particular, the output shaft, which connects the first power splitter and the two side gears to each other in terms of drive, may be designed as a continuous shaft or as a two-part shaft.

In one or some embodiments, the at least one shiftable clutch device is designed as a dry clutch, wet multi-plate clutch or hydrodynamic clutch. A design of the at least one shiftable clutch device as a dry clutch, wet multi-plate clutch or hydrodynamic clutch may enable the parts of the drivetrain downstream from it as viewed in the direction of the power flow, in this case the flywheel of the square baler to be engaged, to be disengaged or engaged as required. In particular, the occurrence of additional load peaks in the drivetrain may at least be reduced by designing the at least one shiftable clutch device as a hydrodynamic clutch.

In one or some embodiments, the first power split and the at least two flywheels each have exactly one shiftable clutch device connected between them, which may be shifted independently of one another. This may allow various operating situations to be mapped during initial operation and/or performing the start-up process. For example, the control device may be configured to automatically control the one shiftable clutch device according to the various operating situations. This may mean that the square baler or the drivetrain may initially be put into operation without driving the at least two flywheels (e.g., the control device initially automatically activates only one of the at least two flywheels). Depending on the arrangement of the interposed clutch devices, at least the first power split of the drivetrain may be driven. Furthermore, in addition to the first power split, one or both side gears may be driven without driving the at least two flywheels of the particular side gear. With a delay for this, first one of the flywheels and then the at least one other flywheel may be engaged by activating the particular clutch device. For example, the control device may be configured to automatically control the engagement of one of the flywheels and then the at least one other flywheel (e.g., by activating the respective clutch device) in order to perform the desired delay. Alternatively, it is also contemplated that the at least two flywheels may be engaged simultaneously by correspondingly simultaneously actuating the particular clutch device (e.g., the control device automatically controls each clutch device so that each of the two flywheels are engaged simultaneously).

Alternatively, the square baler or the drivetrain may initially be put into operation only with the at least two flywheels. The at least one additional flywheel may be switched on after a delay (e.g., via automatic control using the control device). In particular, the drivetrain may drive a cutting rotor as another working unit of the square baler, wherein one of the reduction gears assigned to the ram and the cutting rotor may be connected parallel to each other to the first power split.

In one or some embodiments, a control device may be assigned to the drivetrain, which may be configured to control, such as automatically control, the at least one shiftable clutch device. The control device assigned to the drivetrain may perform the switching of the at least one shiftable clutch device automatically (e.g., via sending one or more commands to the respective shiftable clutch device) so that it is ensured that incorrect operation or premature engagement of the, or the at least two, flywheels of a particular side gear cannot occur.

Referring to the figures, FIG. 1 shows a schematic and exemplary representation of a square baler 1 in side view. The square baler 1 may be coupled to an agricultural production machine not shown in the figures, such as a tractor, so that the square baler 1 and the agricultural production machine jointly form a so-called agricultural train. The square baler 1 may comprise a housing, not shown in FIG. 1, which surrounds the components of the square baler 1 attached to a chassis 2 of the square baler 1. The square baler 1 may further comprise a drivetrain 3 shown in more detail in FIG. 2, through which various working units of the square baler 1 may be driven. Such working units are, for example, a pick-up device 4 (known as a pickup for picking up or collecting harvested material deposited in a swath on an agricultural area), a cutting rotor 5 for shredding the picked-up harvested material, a feed rake 6 for pre-compressing the shredded harvested material and feeding it into a pressing channel of the square baler 1, a ram 7 movably arranged or positioned between end positions in the pressing channel of the square baler 1 for pressing the pre-compressed crop into a square bale, and a knotter 8 for binding the pressed square bale. A needle and its needle drive which interact with the knotter 8 may form another working unit.

In one or some embodiments, the drivetrain 3 of the square baler 1 is supplied with drive power by the agricultural machine. For this purpose, at the rear, the agricultural production machine has a power take-off (PTO), known per se. The drivetrain 3 of the square baler 1 may comprise a drive shaft 9, which in turn may comprise a torque input connection of the drivetrain 3, through which the drivetrain 3 of the square baler 1 may be connected to the power take-off of the agricultural production machine.

Figure 3:
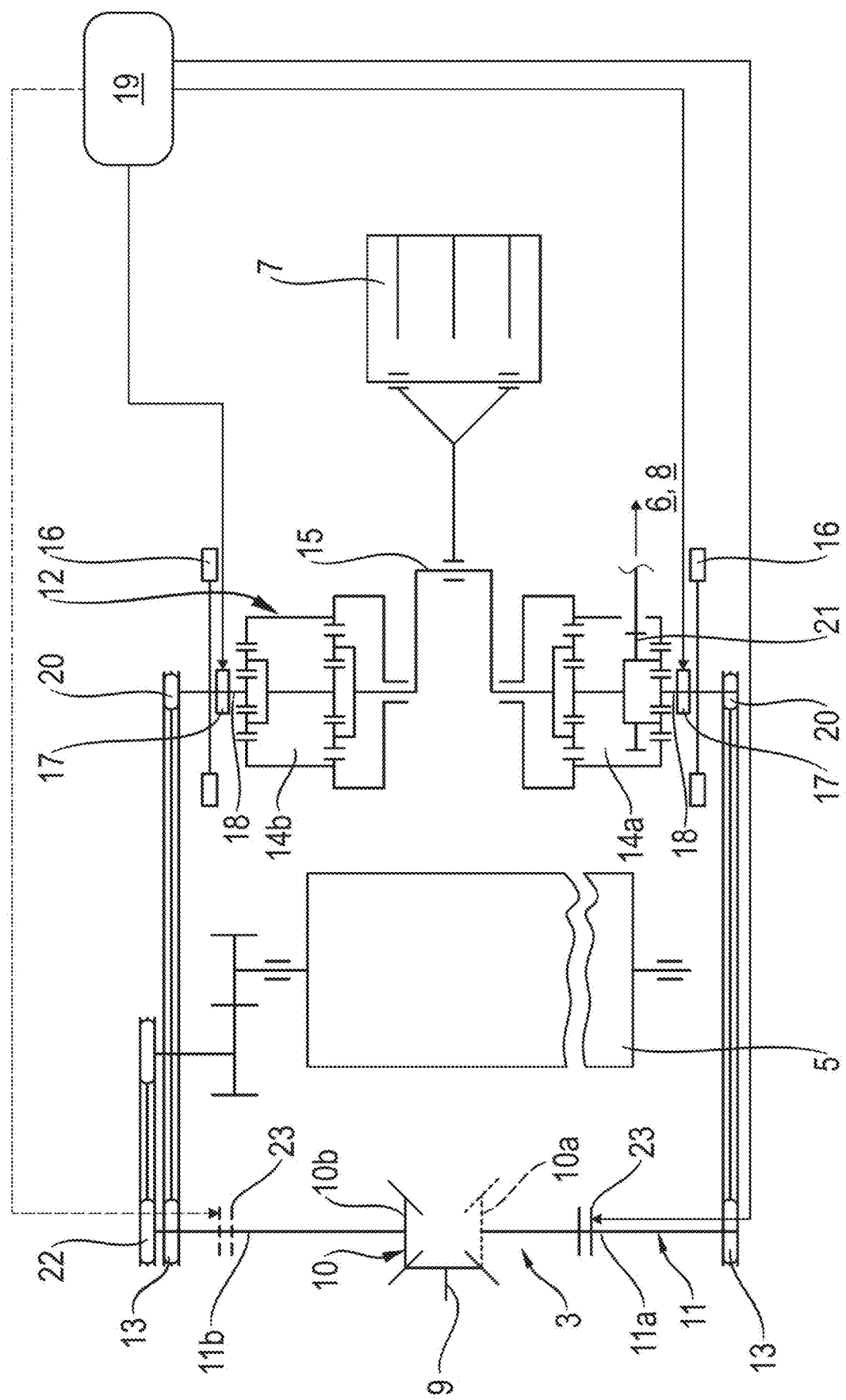
FIG. 3 illustrates a schematic and exemplary representation of another embodiment of the gear assembly according to FIG. 2.

In one or some embodiments, a first power split 10, which may be formed as a bevel gear stage, is connected to the drive shaft 9 of the drivetrain 3. One bevel gear of the first power split 10, which may be formed as a bevel gear stage, comprises a continuous output shaft 11 which extends transversely to the drive shaft 9 (e.g., transversely to the main extension direction of the square baler 1), to which the other bevel gear of the bevel gear stage may be connected. It is also contemplated that the output shaft 11 is designed in two parts, as shown in FIG. 3, so that a first and a second output shaft 11a, 11b are connected by a bevel gear 10a, 10b arranged or positioned on these to the power split 10 designed as a bevel gear stage. For illustration purposes, the additional bevel gear 10a is shown with a dashed line.

Figure 2:
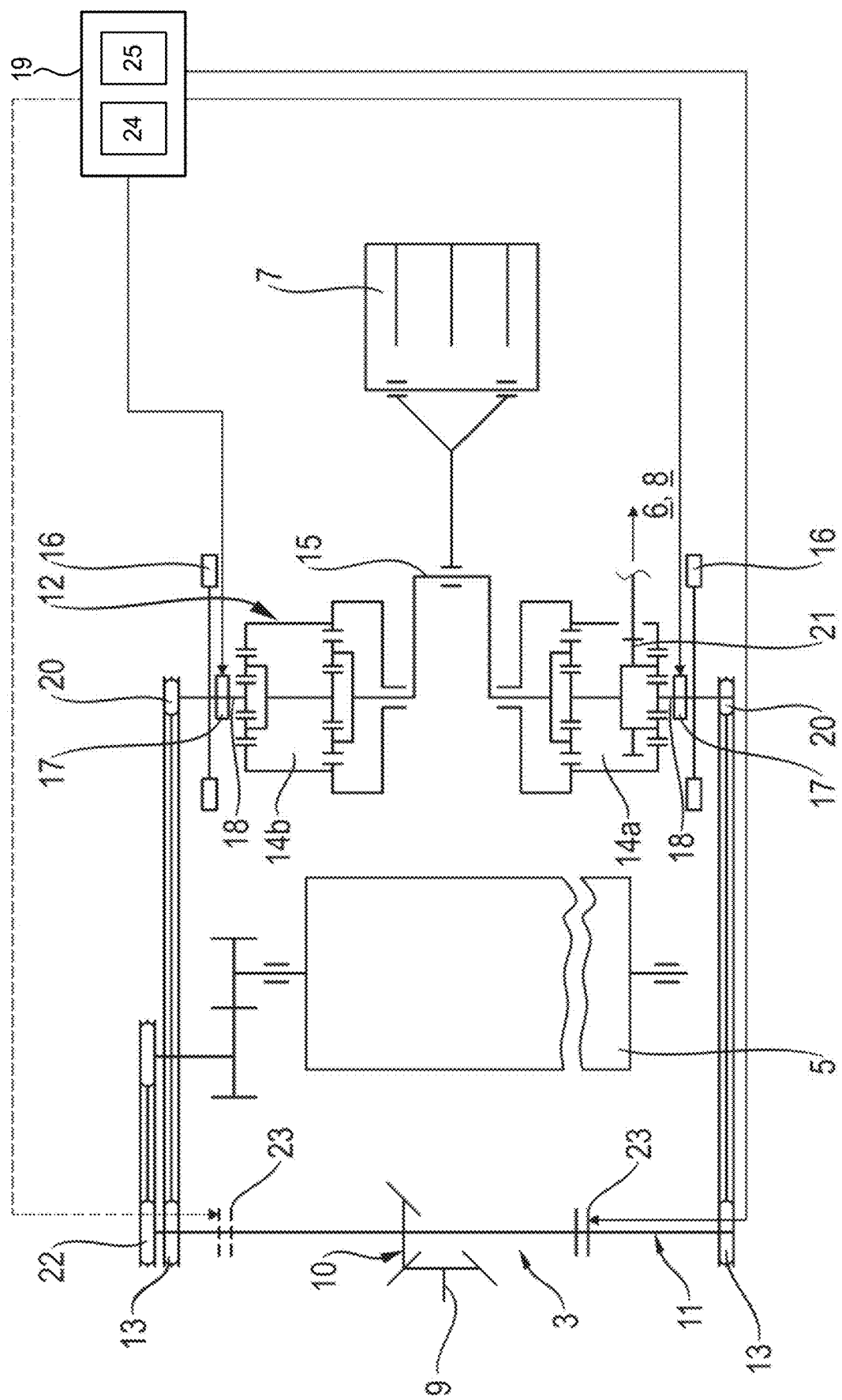
FIG. 2 illustrates a schematic and exemplary representation of a gear assembly of the square baler according to FIG. 1.

In one or some embodiments, the square baler 1 and the drivetrain 3 of the square baler 1 comprises, in addition to the aforementioned drivetrain components, a transmission device 12 designed as a gear assembly. As shown in FIGS. 2 and 3, the transmission device 12 may comprise two side gears 13, which may be indirectly drivable by a power take-off shaft of the agricultural production machine. In this context, "indirectly" may mean that the two side gears 13 may be connected to the power split 10. In one or some embodiments, the two side gears 13 are arranged or positioned opposite each other.

As shown in particular in FIG. 2, a particular drive of the side gears 13 may be arranged or positioned on the continuous output shaft 11 or the first or second output shafts 11a, 11b of the power split 10, as shown in FIG. 3. A drive power provided to the two side gears 13 using the power split 10 may be converted by means of the two side gears 13; however, the drive power may also be transmitted without conversion.

In one or some embodiments, the two side gears 13 are formed as a traction gear, such as a V-belt gear, which may be considered advantageous with respect to the design of the transmission device 12 designed as a gear assembly. However, the two side gears 13 may also be designed as another traction gear, for example as a chain gear or as a bevel gear stage. The use of a traction gear as a side gear 13 may make it particularly easy to bridge a spatial distance between the power split 10 and the ram 7.

In one or some embodiments, downstream from the two side gears 13, there is at least one reduction gear 14a, 14b, which may be configured to convert the drive output provided using the particular side gear 13 into drive output required for the operation of the ram 7. The reduction gear 14a, 14b downstream from the particular side gear 13 may be connected (e.g., is configured to be connected) or is connected on the output side to a crankshaft 15 on which the ram 7 is mounted.

In one or some embodiments, at least one flywheel 16 is connected between the at least one reduction gear 14a, 14b and the particular side gear 13. In one or some embodiments, at least one shiftable clutch device 17 may in turn be connected between the at least one flywheel 16 and the at least one reduction gear 14a, 14b. In one or some embodiments, the at least one shiftable clutch device 17 is arranged or positioned directly between the at least one flywheel 16 and a gear input 18 of the at least one reduction gear 14a, 14b.

The actuation of the at least two shiftable clutch devices 17 may be automatically controlled using a control device 19 assigned to the transmission device 12. In one or some embodiments, the control device 19 may comprise computing functionality (e.g., to perform one, some, or all operations, such as automatic operations, described herein). For example, FIG. 2 illustrates control device 19 as including at least one processor 24 and at least one memory 25. In one or some embodiments, the processor 24 may comprise a microprocessor, controller, PLA, or the like. Similarly, the memory 25 may comprise any type of storage device (e.g., any type of memory). Though the processor 24 and the memory 25 are depicted as separate elements, they may be part of a single machine, which includes a microprocessor (or other type of controller) and a memory. Alternatively, the processor 24 may rely on the memory 25 for all of its memory needs.

The processor 24 and the memory 25 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The control device 19 may be assigned to the square baler 1 itself or to the agricultural machine. In particular, the control device 19 may automatically control the actuation of the at least two shiftable clutch devices 17 in such a way that, when the square baler 1 is started up, the two shiftable clutch devices 17 are in an open state. In one or some embodiments, an open state of the shiftable clutch devices 17 may be a state in which the particular flywheel 16 is decoupled from the reduction gear 14a, 14b downstream thereof, and therefore no drive output may be transmitted from the at least one flywheel 16 or the component bearing the at least one flywheel 16, such as the at least one side gear 13, to the gear input 18 of the particular reduction gear 14a, 14b. In this switched state of the at least two shiftable clutch devices 17, the at least two flywheels 16 may be accelerated from standstill using the drive power provided by the two side gears 13. As soon as the control device 19 determines that the flywheels 16 have reached their nominal speed (e.g., the speed at which the flywheels 16 are to operate after start up) or a speed which is below the nominal speed, such as a speed which is up to 70% below the nominal speed (e.g., the value 70% below the nominal speed is included in this range), the control device 19 (which may monitor the speed of the flywheels 16) may automatically control the actuation of the shiftable clutch devices 17 in such a way that the shiftable clutch devices 17 are transferred to an engaged state (e.g., responsive to the control device 19 determining that the speed of the flywheels 16 (such as the speed of a respective flywheel 16) has reached at least 70% below the nominal speed, the control device 19 may automatically transmit a command to the shiftable clutch devices 17 in order to control the shiftable clutch devices into the engaged state).

In a particular example, the control device 19 may control each of a first shiftable clutch device 17 and a second shiftable clutch device 17 based on the respective speed of the first flywheel and the second flywheel 16, respectively (e.g., responsive to the control device determining that the speed of the first flywheel is at least a first predetermined speed, control the first shiftable clutch device 17 to the engaged state; responsive to the control device determining that the speed of the second flywheel is at least a second predetermined speed, control the second shiftable clutch device 17 to the engaged state; in one embodiment, the first predetermined speed and the second predetermined speed are the same; alternatively, the first predetermined speed and the second predetermined speed are different). In one or some embodiments, an engaged state is a state in which the particular flywheel 16 is coupled to the reduction gear 14a, 14b downstream thereof, and therefore a drive power may be transmitted from the flywheel 16 or the component carrying the flywheel 16, such as the particular side gear 13, to the gear input 18 of the at least one reduction gear 14a, 14b.

According to one embodiment of the transmission device 12, the at least one shiftable clutch device 17 is designed as a hydraulically actuatable or shiftable clutch device 17, such as a hydraulically actuatable or shiftable multi-plate clutch. In this context, it is contemplated that the control device 19 automatically generates switching signals or control signals (e.g., an example of a type of command) for the components of a hydraulic circuit connected to the at least one hydraulically actuatable or shiftable clutch device 17, for example a hydraulic pump, a shift valve, etc., so that a volume flow for actuating the hydraulically actuatable or shiftable clutch devices 17 is automatically variably adjustable using the control signals to the components.

Alternatively, or in addition, it is contemplated that the at least two shiftable clutch devices 17 may also be actuated manually by an operator, for example by pressing a foot pedal in a passenger compartment of the agricultural machine.

According to one embodiment of the transmission device designed as a gear assembly, the at least one flywheel 16 may be designed as a component of an output drive 20 of the associated side gear 13. According to one embodiment, the at least one flywheel 16 may be formed integrally with the output drive 20 of the associated side gear 13, so that the output drive 20 and the flywheel 16 form a coherent component. Alternatively, the at least one flywheel 16 may be connected in a force fit, form fit and/or material bond to the output drive 20 of the associated side gear 13, downstream from which the at least one flywheel 16 is arranged or positioned.

In one or some embodiments, the transmission device 12 may further comprise an additional power split 21 associated with the at least one reduction gear 14a, 14b. The additional power split 21 may comprise a multi-stage spur gear. This may make it possible to drive further working units, such as the feed rake 6 and/or the knotter 8, in parallel with the ram 7. If the at least one reduction gear 14a, 14b is designed as a two-stage planetary gear, the power split 21, such as a gear of the power split 21 designed as a spur gear, may be operatively connected to a first web of a first gear stage of the reduction gear 14a.

In one or some embodiments, the drivetrain 3 of the square baler 1 may further be submitted or used, starting from the power split 10 or the output shaft 11, 11a of the power split 10, to drive at least one further working unit, for example a pick-up device 4 and/or a cutting rotor 5. For this purpose, at least one further side gear 22 or at least one angular gear may be connected downstream from the power split 10 or the output shaft 11, 11a of the power split 10 and transmit the drive output directly or indirectly, for example via one or more gears, to the further working units (such as pick-up device 4, cutting rotor 5) of the square baler 1.

In one or some embodiments, in order to reliably provide the drive power required in the working units of the square baler 1, such as the drive power of the ram 7, the square baler 1 may include a shiftable clutch device 23 that is connected between the first power split 10 and at least one of the flywheels 16. Alternatively, or in addition, in FIGS. 2 and 3, another shiftable clutch device 23 is shown in dashed lines, which may form an alternative embodiment of the square baler 1 according to one aspect of the invention.

In the embodiments illustrated in FIGS. 2 and 3, the at least one shiftable clutch device 23 may be arranged or positioned on a section of the continuous output shaft 11 between the power split 10 and the side gear 13 or the first output shaft 11a. In one or some embodiments, the additional shiftable clutch device 23 shown in dashed lines may be arranged or positioned on an opposite section of the continuous output shaft 11 between the power split 10 and the side gear 13 or the second output shaft 11b.

For this purpose, the at least one shiftable clutch device 23 may be designed as a dry clutch, wet multi-plate clutch, or hydrodynamic clutch.

In an alternative embodiment, the at least one shiftable clutch device 23 may be integrated into at least one of the side gears 13.

Accordingly, the at least one shiftable clutch device 23 may be designed as a displaceable drive wheel of the side gear 13 designed as a traction gear.

Still alternatively, the at least one shiftable clutch device 23 may comprise a belt clutch, which may be integrated into one of the side gears 13 designed as a traction gear.

In one or some embodiments, the at least one shiftable clutch device 23 is configured to engage the at least one flywheel 16 of at least one of the reduction gears 14a, 14b during initial operation or a startup process of the square baler 1. In an embodiment with exactly one shiftable clutch device 23, only one of the flywheels 16 is drivingly connected to the power split 10 when the square baler 1 is initially operated or a startup process is performed, in that the exactly one shiftable clutch device 23 is in the open switching position. In one or some embodiments, the engagement of the other flywheel 16 using the shiftable clutch device 23 may take place with a delay by closing the shiftable clutch device 23. Thus, the control device 19 may be configured to control engagement of the one or both of the shiftable clutch devices 23. In particular, the control device 19 may automatically control the engagement of a first shiftable clutch device 23 (to engage to a first flywheel 16) differently from a second shiftable clutch device 23 (to engage to a second flywheel 16). In this regard, the control device 19 may automatically delay engagement of the respective flywheels 16. The timing of the automatic control by the control device 19 may depend on a variety of factors. In one embodiment, the automatic control may be predetermined (e.g., a predetermined time delay in engagement of the different flywheels 16). Alternatively, or in addition, the automatic control may be dependent on operation of at least a part of the system (e.g., dependent on a speed of the flywheel 16 associated with the respective shiftable clutch device 23, such as responsive to determining that the flywheel 16 associated with the respective shiftable clutch device 23 is at least a predetermined speed, the control device 19 automatically engages the flywheel 16).

The provision of at least one shiftable clutch device 23 in the part of the drivetrain 3 connected upstream from the flywheels 16 may make it possible to engage the flywheels 16 one after the other when the square baler 1 is started up, as a result of which the mass to be driven using the power take-off of the work machine may be gradually increased when the square baler 1 is initially operated. The square baler 1, according to one aspect of the invention, may therefore be characterized by a lesser need for the drive power to be provided by the work machine. This may mean that the square baler 1 may also be put into operation using less powerful work machines or tractors.

In one or some embodiments, the drivetrain 3 is assigned the control device 19, which may be configured to actuate, such as automatically actuate, the at least one shiftable clutch device 23.

According to the advantageous development that exactly one shiftable clutch device 23 may be interposed between the first power split 10 and the at least two flywheels 16 which may be shifted independently of one another, different operating situations may be mapped during initial operation and/or execution of the startup process of the square baler 1. In particular, in one or some embodiments, the control device 19 may be configured to automatically control any one, any combination, or all of the one shiftable clutch device 23 and one or both of the at least two flywheels 16 as discussed herein (e.g., shifting independently of one another).

Thus, this may mean that the square baler 1 or the drivetrain 3 may initially be put into operation without driving the at least two flywheels 16 by having both shiftable clutch devices 23 in the disengaged shift position (e.g., the control device 19 may be configured to automatically drive the at least two flywheels 16 separately and/or independently). Depending on the arrangement of the interposed shiftable clutch devices 23 in the drivetrain 3, at least the first power split 10 may be driven (e.g., under automatic control of the control device 19). By way of example, a first shiftable clutch device 23 may be positioned between the first power split 10 and the first flywheel 16, and a second shiftable clutch device 23 may be positioned between the first power split 10 and the second flywheel 16. The control device 19 may be configured to control the first shiftable clutch device 23 and the second shiftable clutch device 23 independently of one another.

In addition, the side gears 13 may be driven without driving the at least two flywheels 16 (e.g., the control device 19 may automatically drive the side gears 13 without driving the at least two flywheels 16). With a time offset for driving at least the first power split 10, one of the flywheels 16 of one of the two side gears 13 may then be engaged first and then the at least one further flywheel 16 of the other side gear 13. In this regard, the control device 19 may automatically control the timing of engaging the flywheels 16 (e.g., first sending a command to one of the flywheels 16 of one of the two side gears; waiting a predetermined amount of time; after waiting the predetermined amount of time, sending a command to one of the flywheels 16 of the other side gear). However, it is also contemplated that the at least two flywheels 16 of exactly two side gears 13 may be engaged simultaneously (e.g., the control device 19 may automatically send the command to each of the at least two flywheels 16 at the same time).

Alternatively, the square baler 1 or the drivetrain 3 may initially be put into operation only with the at least two flywheels 16. The at least one additional flywheel 16 may be switched on after a delay (e.g., the control device 19 may automatically control the activation by timing the sending of the commands to the various flywheels 16).

In particular, the drivetrain 3 may drive the cutting rotor 5 as another working unit of the square baler 1, wherein one of the reduction gears 14*a*, 14*b* assigned to the ram 7 and the cutting rotor 5 are connected parallel to each other to the first power split 10.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Square baler
2 Chassis
3 Drivetrain
4 Pick-up device
5 Cutting rotor
6 Feed rake
7 Ram
8 Knotter
9 Drive shaft
10 Power split
10*a* Bevel gear
10*b* Bevel gear
11 Output shaft
11*a* Output shaft
11*b* Output shaft
12 Transmission device
13 Side gear
14*a* Reduction gear
14*b* Reduction gear
Crankshaft
16 Flywheel
17 Shiftable clutch device
18 Gear input
19 Control device
20 Output drive
21 Power split
22 Side gear
23 Shiftable clutch device
24 Processor
25 Memory

The invention claimed is:

1. A square baler comprising:
at least one ram movably arranged in a pressing channel between end positions; and
a drivetrain configured to drive the at least one ram, the drivetrain including a torque input connection through which a torque is supplied to the drivetrain, the drivetrain comprising a transmission device positioned downstream from the torque input connection and including at least one flywheel;
wherein the transmission device includes a first power split connected to the torque input connection and at least two reduction gears assigned to the ram and connected in parallel to one another to the first power split;
wherein the at least one flywheel is connected upstream from each of the at least two reduction gears;
wherein at least one shiftable clutch device is positioned between the first power split and the at least one flywheel and configured to engage the at least one flywheel responsive to the square baler being initially operated or during a startup process.

2. The square baler of claim 1, wherein at least one side gear is positioned between the first power split and the at least two reduction gears assigned to the ram.

3. The square baler of claim 2, wherein the at least one flywheel comprises a plurality of flywheels;
wherein the at least one side gear comprises a plurality of side gears; and
wherein a respective flywheel of the plurality of flywheels is positioned between each of the at least two reduction gears and a respective side gear of the plurality of side gears.

4. The square baler of claim 3, wherein the at least one shiftable clutch device is integrated in at least one of the plurality of side gears.

5. The square baler of claim 4, wherein the plurality of side gears comprise traction gears.

6. The square baler of claim 5, wherein the plurality of side gears comprise V-belt gears or chain gears.

7. The square baler of claim 5, wherein the at least one shiftable clutch device comprises a displaceable drive wheel of the at least one side gear designed as the traction gear.

8. The square baler of claim 5, wherein the at least one shiftable clutch device comprises a belt clutch which is integrated into one of the plurality of side gears designed as the traction gear.

9. The square baler of claim 3, wherein the at least one shiftable clutch device is positioned on an output shaft connecting the first power split and one of the plurality of side gears.

10. The square baler of claim 9, wherein the output shaft comprises a continuous shaft or a two-part shaft.

11. The square baler of claim 1, wherein the at least one shiftable clutch device comprises a dry clutch, a wet multi-plate clutch, or a hydrodynamic clutch.

12. The square baler of claim 1, wherein the at least one flywheel comprises a first flywheel and a second flywheel;
wherein the at least one shiftable clutch device comprises a first shiftable clutch device and a second shiftable clutch device;
wherein the first shiftable clutch device is positioned between the first power split and the first flywheel; and
wherein the second shiftable clutch device is positioned between the first power split and the second flywheel.

13. The square baler of claim 12, further comprising a control device configured to control the first shiftable clutch device and the second shiftable clutch device independently of one another.

14. The square baler of claim 13, wherein the control device is configured to independently control the first shiftable clutch device and the second shiftable clutch device by:
controlling the first shiftable clutch device based on a speed of the first flywheel; and
controlling the second shiftable clutch device based on a speed of the second flywheel.

15. The square baler of claim 1, further comprising:
at least one second shiftable clutch device positioned between the at least one flywheel and one of the at least two reduction gears; and
a control device configured to control, based on a speed of the at least one flywheel, whether the at least one second shiftable clutch device is in an engaged state in which the at least one flywheel is coupled to the one of the at least two reduction gears.

16. The square baler of claim 15, wherein the control device is configured to:
   determine whether the speed of the at least one flywheel is at least a predetermined speed; and
   responsive to determining that the speed of the at least one flywheel is at least the predetermined speed, control the at least one second shiftable clutch device to the engaged state in which the at least one flywheel is coupled to the one of the at least two reduction gears.

17. The square baler of claim 16, wherein the at least one flywheel comprises a first flywheel and a second flywheel;
   wherein the at least one second shiftable clutch device comprises a first second shiftable clutch device and a second second shiftable clutch device;
   wherein the first second shiftable clutch device is positioned between the first flywheel and a first of the at least two reduction gears;
   wherein the second second shiftable clutch device is positioned between the second flywheel and a second of the at least two reduction gears; and
   wherein the control device is configured to:
      determine whether a speed of the first flywheel is at least a first predetermined speed;
      responsive to determining that the speed of the first flywheel is at least the first predetermined speed, control the first second shiftable clutch device to be in the engaged state so that the first flywheel is coupled to the first of the at least two reduction gears;
      determine whether a speed of the second flywheel is at least a second predetermined speed; and
      responsive to determining that the speed of the second flywheel is at least the second predetermined speed, control the second second shiftable clutch device to be in the engaged state so that the second flywheel is coupled to the second of the at least two reduction gears.

18. The square baler of claim 1, wherein the drivetrain is configured to drive a cutting rotor as another working unit of the square baler; and
   wherein one of the at least two reduction gears assigned to the ram and the cutting rotor are connected in parallel to one another to the first power split.

19. The square baler of claim 1, further comprising a control device configured to automatically actuate the at least one shiftable clutch device.

* * * * *